United States Patent [19]

Telkes

[11] 4,011,190

[45] Mar. 8, 1977

[54] SELECTIVE BLACK FOR ABSORPTION OF SOLAR ENERGY

[75] Inventor: Maria Telkes, Newark, Del.

[73] Assignee: Ses, Incorporated, Newark, Del.

[22] Filed: Nov. 24, 1975

[21] Appl. No.: 634,953

[52] U.S. Cl. .................. 260/33.65 B; 106/290; 126/270; 252/62.3 R; 252/62.3 T; 252/512; 428/328

[51] Int. Cl.² .................. C08K 3/08; C08K 5/01; F24J 3/02

[58] Field of Search ............. 106/290; 126/270; 427/216; 428/328; 252/512, 62.3 R, 62.3 T; 260/33.6 SB

[56] References Cited

UNITED STATES PATENTS

| 2,891,879 | 6/1959 | Rohrer | 126/270 |
| 2,917,817 | 12/1959 | Tabor | 29/180 |
| 3,831,269 | 8/1974 | Sommer | 29/612 |
| 3,876,552 | 4/1975 | Moynihan | 428/328 |
| 3,920,413 | 11/1975 | Lowery | 126/270 |

OTHER PUBLICATIONS

Cravalho et al. Chem. Abs. 75, 122446u (1971).

*Primary Examiner*—Melvyn I. Marquis
*Assistant Examiner*—H. H. Fletcher

[57] ABSTRACT

Improved selective black particles for use in solar receivers are described. The improved selective blacks comprise small particles of a metal having a low emissivity which are coated with a thin layer of an optically dark material having high absorptivity and low reflectivity for solar wavelengths and which is transparent for higher wavelengths in the thermal range. The improved selective black particles can be applied, e.g., as a paint, to any surface suitable for a solar heat receiver.

17 Claims, No Drawings

SELECTIVE BLACK FOR ABSORPTION OF SOLAR ENERGY

BACKGROUND OF THE INVENTION

It has long been known that some materials are black in the visible spectrum but reflect or transmit to a considerable extent in the longer infrared regions. This has led to the application of black surfaces to obtain heat from solar radiation. Yet for flat-plate collectors without optical concentration devices, temperature is rather limited since heat losses from the receiver at higher temperatures, primarily from thermal radiation of the black surface, soon equal the incoming energy. Efforts have been directed to find or synthesize selective black surfaces so that they differentiate in their absorption, reflection or transmission characteristics between wavelengths above about 2 microns, i.e., in the "thermal" range and wavelengths below about 2 microns, i.e., in the "solar" range.

Polished zinc is an example of a natural surface with a fair degree of selectivity. For solar radiation the absorptance is of the order of 0.5. The emittance is about 0.05. However, polished zinc is a poor surface for a solar receiver since an absorptance of around 0.9–1.0 is needed. Consequently, efforts have been directed to synthesizing selective black surfaces for solar receivers. In general, materials having low emissivity in the infrared range are the metals — the higher the electrical conductivity and the surface smoothness the lower the emissivity. Non-metals have a high emissivity unless they are transparent to long-wave radiation. Total emissivity for various materials is given in McAdams "Heat Transmission" — McGraw-Hill Book Company, 1942, pp. 393–396.

A number of selective surfaces have been described in the art. These selective black surfaces generally are synthesized by taking a polished metal base and coating it with a very thin optically dark surface layer which is substantially transparent for wavelengths above about 2–3 microns. Exemplary are silver oxide on silver, iron oxide on steel, copper oxide on aluminum, copper oxide on copper and other metals, and nickel-zinc-sulfide complex, known as "nickel-black", on nickel, galvanized iron, or on other metals. The nickel-black and copper oxide coatings are generally used in practice. Preparation of a number of selective blacks is described by Tabor. U.S. Pat. No. 2,917,817, issued Dec. 22, 1959. The very thin layer of dark material can be obtained by such techniques as vapor deposition or electro deposition. An alternative method is to paint the dark material onto the metal surface; but this method, while inexpensive to do, suffers a disadvantage in that the thickness of the final layer is generally greater than that which can be obtained by the aforesaid deposition methods.

In nearly all the conventional surfaces there is considerable difficulty in getting a high solar absorptivity since as efforts are made to increase absorptivity, the emissivity usually rises very rapidly. An absorptance of 0.8 can often be obtained with almost no effect on the emittance of the base; however, by the time absorptivity has been raised to 0.9, by using thicker layers or changes in the recipe, the emittance has risen considerably.

SUMMARY OF THE INVENTION

It has now been discovered that blacks of high effectiveness can be prepared by coating reflective metal particles with a layer of a selective black material. The coated particles can be mixed with a suitable vehicle to form a paint which can be applied easily as a thin film to any suitable surface.

The reason for improved selectivity is not known with certainty. It is believed, however, that with panels prepared by painting a reflective sheet material, such as aluminum, with a layer of selective black, such as cupric sulfide, the layer has a number of cupric sulfide particles superimposed, resulting in multiple reflections as the solar beam is finally absorbed. The multiple layer particles of cupric sulfide are a hindrance to the maintenance of the low emissivity of the aluminum sheet. In the present invention, the solar rays are absorbed more effectively by the thin black surface film covering the core of reflective material.

DETAILED DESCRIPTION OF THE INVENTION

In the present invention, the individual substrate or core is a highly reflective material having a low emissivity, i.e., less than about 0.1 and preferably less than about 0.05. Examples of such materials include aluminum, nickel, copper, and zinc, which are low in cost and which are usually available in the form of fine powder or flakes. Other materials available in the form of flakes, or powder at a relatively moderate cost are: brass, or bronze, alloys of copper available in an extensive variety of composition, particle (or flake) size and shape. One of the most readily available materials is zinc powder or zinc dust, which is available in very small particle-sizes at relatively low cost. The core particles desirably are small in diameter and range in diameter from about 0.5 microns up to about 10 microns, and preferably up to about 5 microns.

The core particles are coated with a thin layer of a material having a high solar absorptivity and transmittance in the long infrared wavelengths. The coating material is generally a semiconductor. Exemplary materials are the oxides or sulfides of metals such as copper, lead, molybdenum and the like. One or more materials can be used in the coating. The coating material should have an absorptivity ($\alpha$) of at least about 0.90 and preferably about 0.95 for energy in the solar wavelengths reflectivity of less than about 0.1 and preferably less than about 0.05 for solar wavelengths, and transmit wavelengths longer than 2 microns.

The coating can be effected by any suitable means. For example, a coating of copper oxide or copper sulfide can be prepared by depositing a thin film of copper on the core by electroless chemical deposition and then converting the copper to the oxide or sulfide. The coating can vary in thickness up to about 1 micron. To provide sufficient coverage of the particle, it is preferred that the film be at least 2 molecules thick.

In selecting a coating material for a particular reflective metal particle, care should be exercised to obtain a dark, preferably black color which undergoes little or no change with use. Some materials can interact with the metal particle and produce a color change which is less effective. For example, zinc coated with lead and copper sulfides gradually undergoes a change from black to brown in time with a loss in effectiveness.

The coated particles can be used as a pigment in preparing a paint which can easily be applied to a desired surface as a thin film in accordance with known technology. For example, the coated particles can be mixed with a binder and volatile solvent to provide a paint which can be brushed or sprayed onto a substrate which can be metal, wood, masonry, or other desired material. The binder should, of course, be transparent for wavelengths longer than about 3 microns. Such binders can be found in the group of silicones, which are commercially available. The preparation of paint formulations having varying proportions of binder, solvent, and the selective black particles are within the skill of the practitioner of paint technology. The selective black paint can be applied over any non-selective paint, although care should be taken that the non-selective black paint is well bonded to the substrate and is not chipping or flaking away from the substrate.

EXAMPLE I

This example illustrates the preparation of coated particles. Zinc powder, which is inexpensive and readily available, is used primarily. The zinc powder is first cleaned to remove grease and any zinc oxide film present. A dilute solution of sodium carbonate or other detergent is effective to remove grease. A dilute solution of HCl (2–5% HCl) is effective to remove zinc oxide.

CuO on Zn

A solution was prepared by dissolving 10 to 20 grams $CuSO_4 \cdot 5H_2O$ in 100 grams boiling distilled water and adding 0.05 N NaOH. Upon addition of the caustic, a precipitate forms at first and then rapidly dissolves. Sufficient caustic was added to provide 5 grams solid NaOH for each 100 grams $CuSO_4 \cdot 5H_2O$. Each solution was added to a suspension of 100 grams of clean zinc powder of 5 micron particle size in hot distilled water. In a few seconds, the zinc powder became coated with an adherent black coating. The solution was decanted from the coated particles which were washed several times with deionized water and dried in air. The concentration of each solution was varied to provide zinc powder coated with CuO in the following proportions, expressed as percent by weight copper:

Sample A — 2.5% Cu
Sample B — 4.5% Cu
Sample C — 7% Cu
Sample D — 12.5% Cu

CuS on Zn

Separate solutions of copper tartrate, sodium hydroxide and tartaric acid are prepared in concentrations of 15, 35, and 20 grams/liter respectively and mixed at room temperature to form a coating solution. Cleaned zinc powder is mixed with distilled water and immediately mixed with the coating solution with rapid stirring. The coated powder is washed with distilled water to remove the salts, dried, and treated with a solution of sulfur in carbon disulfide. The sulfur solution should be very dilute so as to obtain a velvety black color rather than a yellowish color. The zinc particles coated with CuS are designated as Sample E.

PbS + CuS on Zn

For Sample F, zinc powder was immersion coated in a manner similar to that for Sample E. The coating ingredients were

| | g/l |
|---|---|
| Sodium thiosulfate $.5H_2O$ | 240 |
| Lead acetate $.3H_2O$ | 25 |
| Potassium hydrogen tartrate | 30 |
| Cupric sulfate $.5H_2O$ | 20 |

The ingredients were dissolved separately in water and the solutions mixed. The coating was carried out by mixing 50 grams zinc dust with 100 ml of solution at 50° C. A dilute solution of sulfur in carbon disulfide was used to convert the coating to the sulfide form.

$MoO_3$ on Zn

Zinc particles are coated with molybdenum oxide by immersion coating with a solution of 30 grams $(NH_4)_2MoO_4$ per liter at a temperature of 120° F.

$MoO_3$ on Al

Aluminum particles are coated with molybdenum oxide by immersion coating with the same ammonium molybdate bath described above.

EXAMPLE II

Solar absorption tests were conducted with various coated zinc particles. A paint was prepared by mixing the coated particles with a solution of Dow Corning 805 silicone resin in xylene (50% solids content). Approximately 30 grams of resin were used for each 100 grams of coated zinc particles.

Test panels were prepared by painting the test paint onto one side of sheet aluminum 0.030 inches thick and one foot square. The aluminum sheet was cleaned (degreased) before painting. After xylene solvent is evaporated, which occurs rather rapidly, the coating is cured by heating it above 120° C for at least an hour. This can be effected in the sun if desired. The opposite side of the aluminum test panel was painted white.

The test panel was mounted in an insulated box with the black surface exposed and subjected to stagnation temperature testing. The insulated boxes had a transparent (glass or plexiglass) front cover and a white-painted sheet aluminum back cover. The test panels were supported at a distance of one inch from each cover. When exposed to summer sunshine the "stagnation temperature" was a maximum of 250° F. As a standard for comparison, stagnation temperature of a panel painted with a conventional black paint was obtained. The conventional black paint is a commercially available spray paint (RUSTOLEUM). Improved selectivity is demonstrated by the increase in temperature obtained at peak temperature around mid-day with the selective blacks of the invention over that obtained with the non-selective black of the standard panel.

The effectiveness of zinc particles coated with copper oxide (Sample C) is shown by a stagnation temperature of 199° F, which is 13° F more than 186° F stagnation temperature obtained with the standard panel. This is 13% improvement (temperature increase above temperature of standard panel divided by temperature increase of standard panel above ambient temperature). For further comparison, a commercial selective black, by Alcoa, gave a stagnation temperature of 193° only a 7° F increase over the standard panel. A new selective black obtained from Aloca gave a 13% improvement. These commercial blacks are electrodeposited coatings and are relatively expensive.

In tests with zinc particles coated with CuS + PbS (Sample No. F), an increase of 13° F over that of the standard panel was obtained. However, the color gradually changed from black to brown over a period of about 30 days with a resultant decline in stagnation temperature. The temperature difference stabilized at 8° F over that of the standard panel.

I claim as my invention:

1. A black particle suitable for absorption of solar energy which comprises a reflective metal particle having an emissivity less than about 0.1 coated with a thin film of a semiconductor material which transmits wavelengths longer than 2 microns and which has an absorptivity of at least about 0.90, and a reflectivity of less than about 0.1.

2. The particle according to claim 1 having a diameter less than about 10 microns.

3. The particle according to claim 2 wherein the film is less than about 1 micron thick.

4. The particle according to claim 1 wherein the metal is aluminum.

5. The particle according to claim 1 wherein the metal is zinc.

6. The particle according to claim 5 wherein the film is cupric oxide.

7. The particle according to claim 1 wherein the metal has an emissivity less than about 0.05 and the semiconductor material has an absorptivity of at least about 0.95.

8. The particle according to claim 1 having a diameter less than about 5 microns and the film is less than about 1 micron thick.

9. A black surface for absorption of solar energy comprising a substrate coated with black particles in a binder transparent to wavelengths longer than about three microns, said black particle being a reflective metal particle having an emissivity less than about 0.1 covered with a thin film of a semiconductor material which transmits wavelengths longer than 2 microns and which has an absorptivity of at least about 0.90 and a reflectivity of less than about 0.1.

10. The black surface according to claim 9 wherein the substrate is aluminum.

11. The black surface according to claim 10 wherein the substrate is copper.

12. The black surface according to claim 9 wherein the metal particle has a diameter less than about 5 microns and the film is less than about 1 micron thick.

13. A paint comprising a solvent, a binder transparent to wavelengths longer than about 3 microns, and a pigment, said pigment being a reflective metal particle having an emissivity less than about 0.1 covered with a thin film of a semiconductor material which transmits wavelengths longer than 2 microns and which has an absorptivity of at least about 0.90 and a reflectivity of less than about 0.1.

14. The paint according to claim 13 wherein the metal particle has a diameter less than about 5 microns and the film is less than about 1 micron thick.

15. The paint according to claim 14 wherein the metal particle is zinc.

16. The paint according to claim 14 wherein the metal particle is aluminum.

17. The paint according to claim 15 wherein the film is cupric oxide.

* * * * *